(12) United States Patent
Trivedi et al.

(10) Patent No.: US 9,049,241 B2
(45) Date of Patent: *Jun. 2, 2015

(54) PEER DISCOVERY AND SECURE COMMUNICATION IN FAILOVER SCHEMES

(71) Applicant: Juniper Networks, Inc., Sunnyvale, CA (US)

(72) Inventors: Atul Narendra Trivedi, San Jose, CA (US); Steven A Malmskog, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 122 days.

This patent is subject to a terminal disclaimer.

(21) Appl. No.: 13/855,188

(22) Filed: Apr. 2, 2013

(65) Prior Publication Data

US 2013/0227022 A1     Aug. 29, 2013

Related U.S. Application Data

(63) Continuation of application No. 11/421,386, filed on May 31, 2006, now Pat. No. 8,429,396.

(51) Int. Cl.
*H04L 29/00* (2006.01)
*H04L 29/08* (2006.01)
*H04L 29/06* (2006.01)

(52) U.S. Cl.
CPC ............ *H04L 67/24* (2013.01); *H04L 63/04* (2013.01); *H04L 63/205* (2013.01)

(58) Field of Classification Search
CPC ........ H04L 67/24; H04L 63/04; H04L 63/205
USPC .......................................... 713/150; 709/223
See application file for complete search history.

(56) References Cited

U.S. PATENT DOCUMENTS

| | | | |
|---|---|---|---|
| 6,055,575 A | 4/2000 | Paulsen et al. | |
| 6,401,120 B1 | 6/2002 | Gamache et al. | |
| 7,411,916 B2 | 8/2008 | Sakov et al. | |
| 7,526,549 B2 | 4/2009 | Block et al. | |
| 2003/0028777 A1* | 2/2003 | Hennessey et al. | 713/176 |
| 2006/0015600 A1* | 1/2006 | Piper | 709/223 |
| 2007/0211705 A1* | 9/2007 | Sunstrum | 370/356 |
| 2008/0112354 A1 | 5/2008 | Toutonghi | |

OTHER PUBLICATIONS

ICS Triplex ISaGRAF, Inc.; Redundancy and Failover Mechanism; www.icstriplexisagraf.com; Feb. 2004; pp. 1-6.
R. Hinden; Virtual Router Redundancy Protocol (VRRP); Network Working Group; Request for Comments: 3768; Apr. 2004; pp. 1-25.

(Continued)

*Primary Examiner* — Jeffrey Pwu
*Assistant Examiner* — Helai Salehi
(74) *Attorney, Agent, or Firm* — Harrity & Harrity, LLP (57) ABSTRACT

A system discovers peer nodes in a failover system, establishes a secure channel between at least two of the peer nodes, and exchanges state information over the secure channel.

20 Claims, 9 Drawing Sheets

(56) References Cited

OTHER PUBLICATIONS

Juniper Networks, Inc.; DX Application Acceleration Platform; Installation and Administration Guide for DXOS Version 5.0; Rev. 1.00, Oct. 10, 2005; pp. 113-154.

Co-pending U.S. Appl. No. 11/421,386, filed May 31, 2006 entitled "Peer Discovery and Secure Communication in Failover Schemes" by Trivedi et al, 32 pages.

U.S. Appl. No. 60/766,283, "Plug and Play Server-Less VoIP Telephone System", Sunstrum, file date Jan. 8, 2006.

* cited by examiner

PEER DISCOVERY AND SECURE COMMUNICATION IN FAILOVER SCHEMES

RELATED APPLICATION

This application is a continuation of U.S. patent application Ser. No. 11/421,386, filed May 31, 2006, the disclosure of which is incorporated by reference herein.

BACKGROUND

1. Field of the Invention

Implementations consistent with the principles of the invention relate generally to data communication and, more particularly, to peer discovery and secure communication in a failover scheme.

2. Description of Related Art

Fault-tolerance is a property of a system in which the system continues to operate properly in the event of failure of some of its parts. Duplication can provide fault-tolerance by, for example, providing multiple identical instances of the same system component and switching to one of the remaining instances in case of a failure.

In a fault-tolerant system, each system component may discover the presence of other components in the system. In one existing system, a component may transmit multicast messages to other components located in the same local network. This discovery technique, however, does not extend beyond the local network.

In a fault-tolerant system, each system component may exchange health information with other components in the system. In existing systems, the components exchange health information over unsecure communication channels. A problem that might arise, however, is that an attacker might insert poisoned health information into the system. The insertion of poisoned health information is a basic form of denial of service attack, where the poisoned health information might make it appear as if a component has failed or is otherwise unavailable (when in fact it is not).

SUMMARY

According to one aspect, a method may include discovering peer nodes in a failover system; establishing a secure channel between at least two of the peer nodes; and exchanging state information over the secure channel.

According to another aspect, a failover system may include means for discovering peer nodes in the failover system; means for establishing a secure channel between each pair of the peer nodes; and means for transmitting state information over the secure channels.

According to yet another aspect, a failover system may include first peer nodes and a second peer node. The second peer node may discover at least one of the first peer nodes, establish a secure channel between the second peer node and the at least one first peer node, receive state information over the secure channel, and determine whether a failover event has occurred based on the received state information.

According to a further aspect, a system may include first peer nodes and a second peer node. The second peer node may send a broadcast discovery message to dynamically discover a local one of the first peer nodes, where the local peer node connects to the second peer node via a local network. The second peer node may send a unicast discovery message to statically discover a remote one of the first peer nodes, where the remote peer node connects to the second peer node via a wide area network. The second peer node may also receive state information from the local peer node and the remote peer node.

According to another aspect, a method may include sending, by a first peer node, a broadcast discovery message to discover a local peer node, where the local peer node connects to the first peer node via a local network; sending, by the first peer node, a unicast discovery message to discover a remote peer node, where the remote peer node connects to the first peer node via a wide area network; receiving state information from the local peer node and the remote peer node; and determining whether a failover event has occurred based on the received state information.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Implementations consistent with the principles of the invention provide a technique for providing secure communication of state information in a failover system, including the discovery of peer nodes and the negotiation of a secure form of communication between the peer nodes.

Exemplary Network

Figure 1:
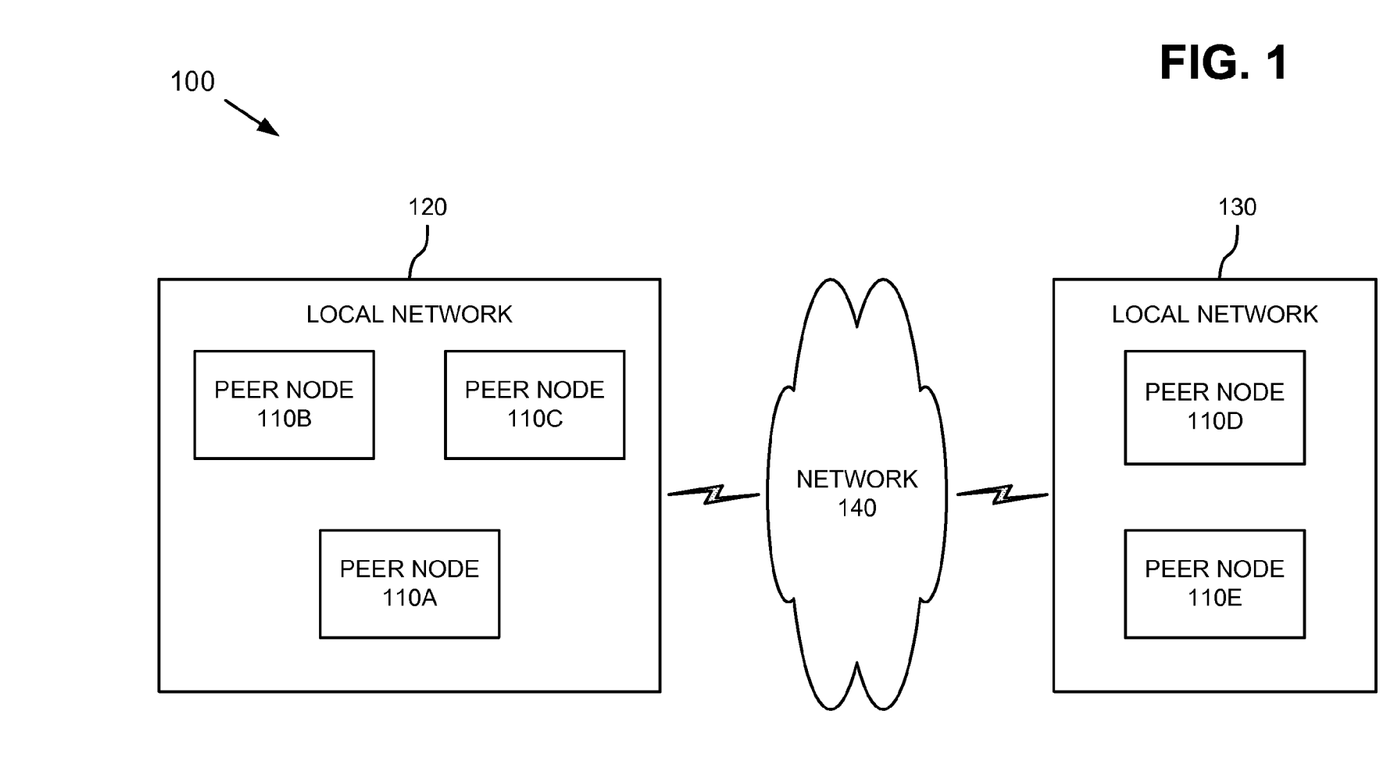
FIG. 1 is an exemplary diagram of a network in which systems and methods consistent with the principles of the invention may be implemented.

FIG. 1 is an exemplary diagram of a network 100 in which systems and methods consistent with the principles of the invention may be implemented. Network 100 may include peer nodes 110A, 110B, ..., 110E (collectively referred to as peer nodes 110). Peer nodes 110A, 110B, and 110C may connect together via a local network 120. Peer nodes 110D and 110E may connect together via a local network 130. Peer nodes 110A-110C may connect to peer nodes 110D-110E via network 140. Local networks 120 and 130 may include local area networks (LANs). Network 140 may include a wide area network (WAN). While a particular number and arrangement of peer nodes 110 and networks 120-140 are shown in FIG. 1, in practice, there may be more or fewer peer nodes 110 and/or networks 120-140.

Peer nodes 110 may include any set of similar network devices. Examples of peer nodes 110 may include routers, firewalls, data center accelerators, load balancers, global server load balancers, etc.

Figure 2:
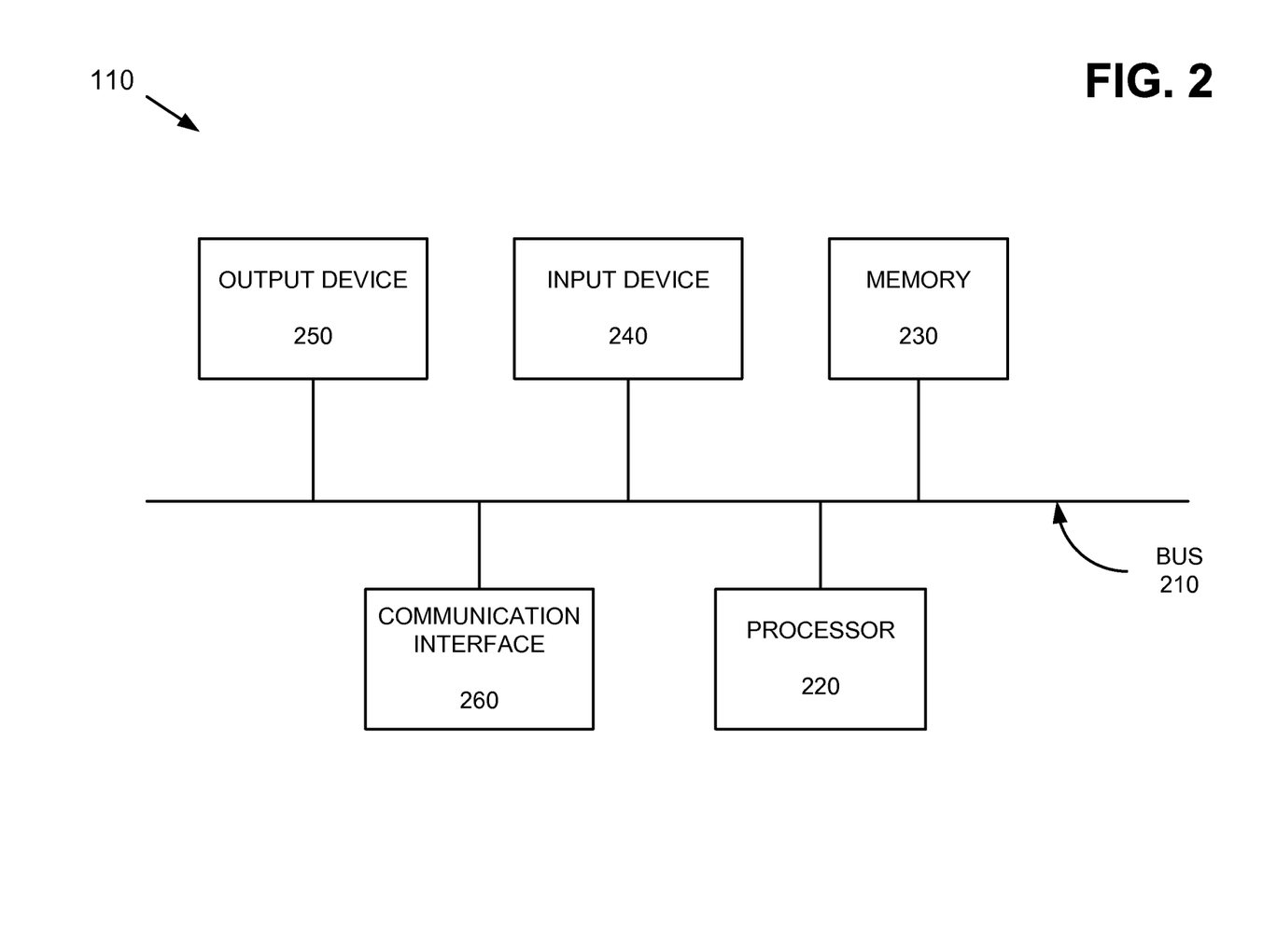
FIG. 2 is an exemplary block diagram of a peer node of FIG. 1.

FIG. 2 is an exemplary diagram of a peer node 110. Peer node 110 may include a bus 210, a processor 220, a memory 230, an input device 240, an output device 250, and a communication interface 260. Bus 210 may include a path that permits communication among the elements of peer node 110.

Processor 220 may include a processor, microprocessor, or processing logic that may interpret and execute instructions. Memory 230 may include a random access memory (RAM) or another type of dynamic storage device that may store information and instructions for execution by processor 220; a read only memory (ROM) device or another type of static storage device that may store static information and instructions for use by processor 220; and/or a magnetic and/or optical recording medium and its corresponding drive.

Input device 240 may include a mechanism that permits an operator to input information to peer node 110, such as a keyboard, a mouse, a pen, voice recognition and/or biometric mechanisms, etc. Output device 250 may include a mechanism that outputs information to the operator, including a display, a printer, a speaker, etc. Communication interface 260 may include any transceiver-like mechanism that enables peer node 110 to communicate with other devices and/or systems.

Peer node 110, consistent with the principles of the invention, may perform certain operations, as described in detail below. Peer node 110 may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium or from another device via communication interface 260. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Processing

FIGS. 3-6 are flowcharts of exemplary processing for discovering peer nodes and exchanging state information over secure communication channels. The processing described with regard to FIGS. 3-6 will be described in terms of a single peer node within a failover system that may be implemented within a network, such as exemplary network 100 of FIG. 1. It should be understood that this processing may also be performed by some or all of the peer nodes in the failover system.

Figure 3:
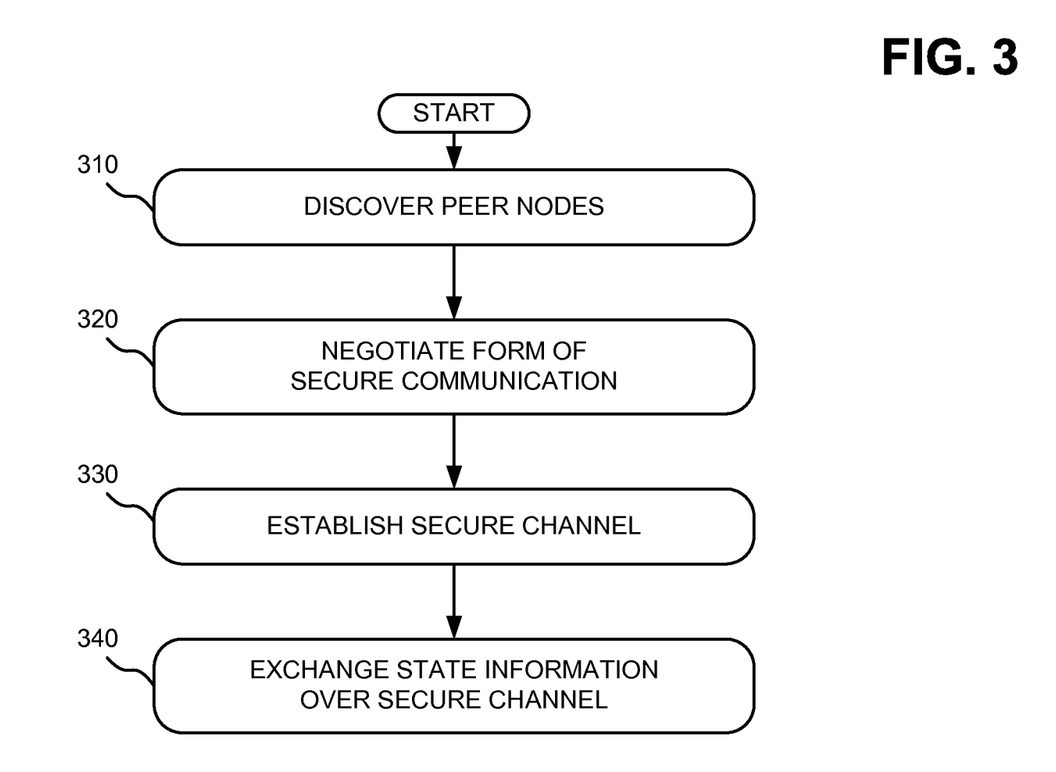
FIGS. 3-6 are flowcharts of exemplary processing for discovering peer nodes and exchanging state information over secure communication channels.

Processing may begin with a peer node (e.g., peer node 110A) discovering other peer nodes 110 in the failover system (block 310). In the failover system, each peer node tracks the state of each of the other peer nodes participating in the failover system. The peer nodes may use this state information to determine when a failover event has occurred. A "failover event," as used herein, may include any condition or trigger that may cause a failover to occur or indicate that a failover needs to occur, such as a node becoming inactive (e.g., a node failing or otherwise becoming unresponsive or unreachable).

Peer node 110A may use a hybrid discovery technique that includes a first technique for discovering local peer nodes 110 (i.e., peer nodes 110 that connect to peer node 110A via a local network (e.g., local network 120)) and a second technique for discovering remote peer nodes 110 (i.e., peer nodes 110 that connect to peer node 110A remotely, such as via a wide area network (e.g., network 140)).

Figure 4:
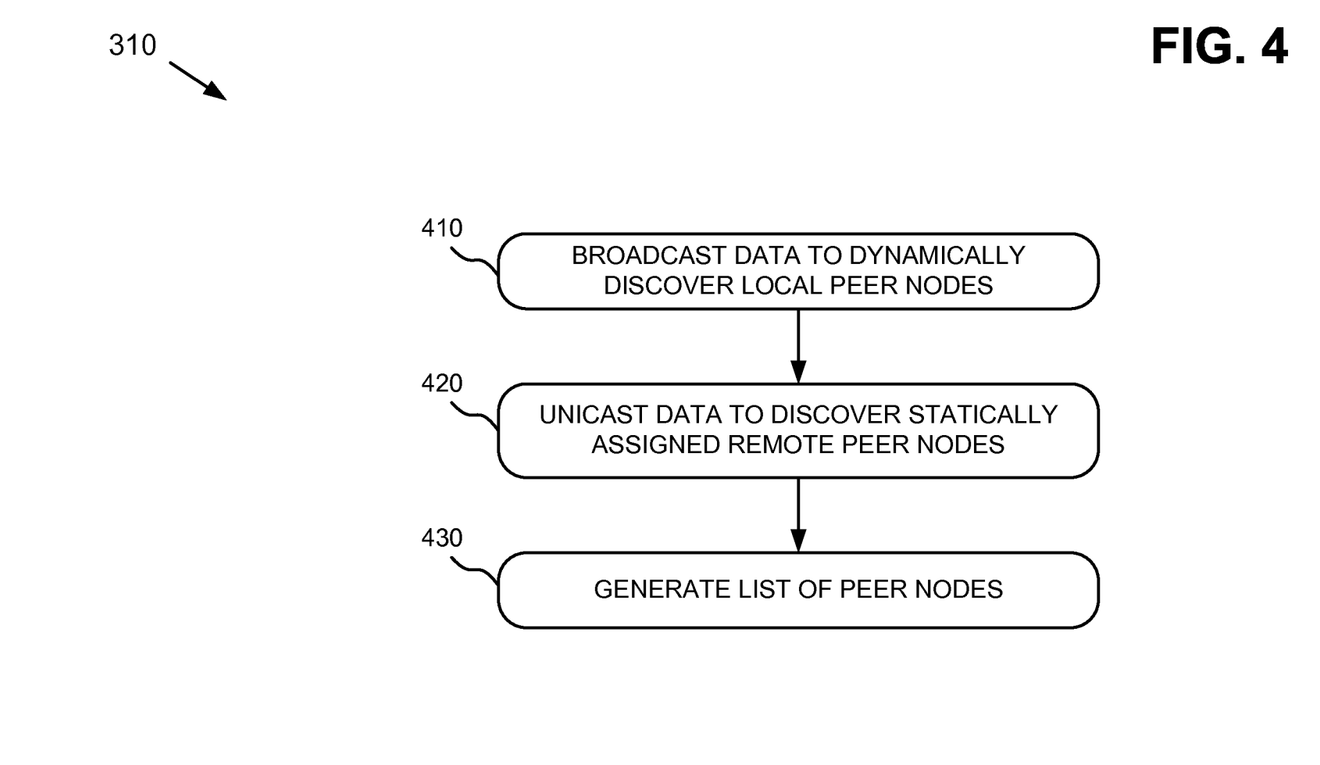

FIG. 4 is a flowchart of exemplary processing for discovering peer nodes 110. Data may be broadcast by a peer node to dynamically discover peer nodes that connect to the same local network (block 410). In one implementation, peer node 110A may broadcast data to a predetermined port. The data may, for example, take the form of a discovery message and identify the peer node from which the discovery message originated (i.e., peer node 110A). The other peer nodes 110 in the same local network 120 (e.g., peer nodes 110B and 110C) may continuously or periodically monitor data received at the predetermined port. When a peer node 110B/110C receives the broadcast data at the predetermined port, peer node 110B/110C may send data, such as a response, back to peer node 110A.

Data may be unicast by a peer node to discover statically assigned remote peer nodes (block 420). This discovery of statically assigned remote peer nodes may be referred to generally herein as "statically discovering the remote peer nodes." In one implementation, a system administrator may provide information to peer node 110A regarding peer node(s) 110 on remote networks (e.g., local network 130) that are part of the failover system. Peer node 110A may then send unicast data to each of these remote peer nodes 110. The data may, for example, take the form of a discovery message and identify the peer node from which the discovery message originated (i.e., peer node 110A). When a remote peer node 110D/110E receives the unicast data, peer node 110D/110E may send data, such as a response, back to peer node 110A.

A list of peer nodes may be generated based on the dynamically discovered local peer nodes and the statically discovered remote peer nodes (block 430). For example, peer node 110A may, as or after it discovers new peer nodes 110, add the peer nodes to a list of peer nodes. The list of peer nodes may include all (or a subset) of the other peer nodes in the failover system.

Returning to FIG. 3, a form of secure communication may be negotiated (block 320). For example, peer node 110A may negotiate with each peer node 110 on its list of peer nodes to identify a form of secure communication that it may use to communicate state information.

Figure 5:
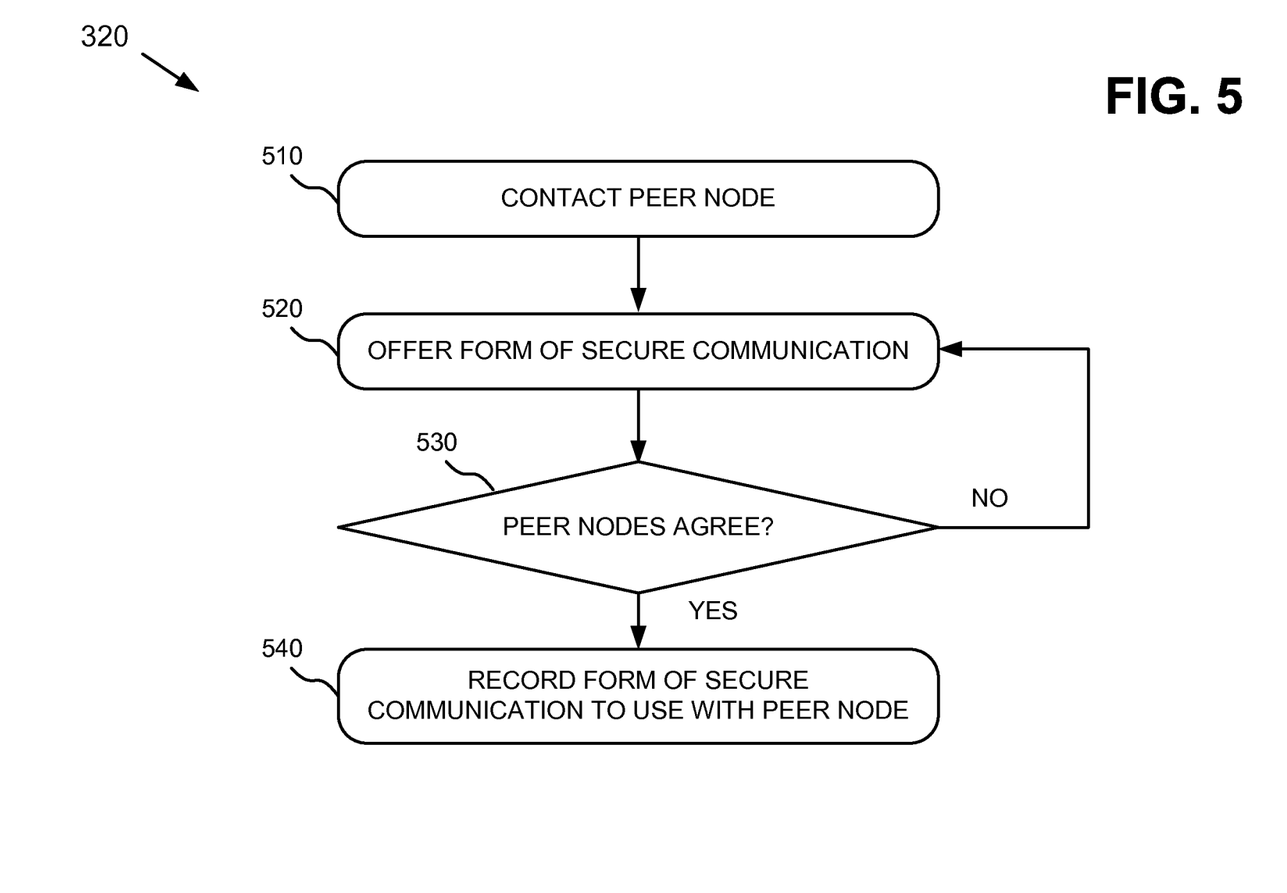

FIG. 5 is a flowchart of exemplary processing for negotiating a form of secure communication between peer nodes 110. A peer node may be contacted and a form of secure communication may be offered (blocks 510 and 520). For example, peer node 110A may contact a peer node on its list of peer nodes and suggest that they use a particular form of secure communication. In one implementation, a peer node 110 may maintain a list of forms of secure communication that it supports, such as the secure sockets layer (SSL) or transport layer security (TLS) protocol, symmetric ciphers and keys, or other forms of secure communication.

If the contacted peer node does not support the offered form of secure communication, the contacted peer node may indicate that it does not support that form of secure communication (block 530—NO). In this case, another form of secure communication may be offered to the contacted peer node (block 520). In one implementation, peer node 110A may first offer its most secure form of communication and if that form of secure communication is not supported by the contacted peer node, then peer node 110A may offer its next most secure form of communication, and so on. In another implementation, peer node 110A may first offer its preferred form of secure communication (which may or may not be the most secure form of communication that peer node 110A supports) and if that form of secure communication is not supported by the contacted peer node, then peer node 110A may offer another form of secure communication, and so on.

Alternatively, if the offered form of secure communication is not supported by the contacted peer node (block 530—NO), then the contacted peer node may offer a secure form of communication back to peer node 110A. In this case, the contacted peer node may continue to offer forms of secure communication to peer node 110A until an agreement is reached. Alternatively, the peer nodes might alternate the offering of forms of secure communication until an agreement is reached.

Alternative techniques for negotiating a form of secure communication are possible. For example, peer node 110A may send a list of the forms of secure communication that it supports to the contacted peer node. The contacted peer node may then select one of the forms of secure communication from the list that it supports.

In any event, this negotiation of forms of secure communication may continue until both peer nodes agree on a form of secure communication. It may be possible that the peer nodes cannot agree on a form of secure communication, such as in the case where the peer nodes do not support any of the same forms of secure communication. In this case, the peer nodes may agree to use an unsecure form of communication.

Once the peer nodes agree on a form of secure communication (block 530—YES), the particular form of secure communication to use for communication with the peer node may be recorded (block 540). For example, peer node 110A may maintain a table of the forms of secure communication to use with the peer nodes in its list of peer nodes.

Returning to FIG. 3, once the form of secure communication is successfully negotiated, a secure channel may be established between the peer nodes (block 330). For example, peer node 110A may establish a secure channel to each of the peer nodes 110 in its list of peer nodes based upon the agreed-upon form of secure communication.

State information may then be exchanged between the peer nodes over the secure channel (block 340). In one implementation, the state information may include any data that helps in the operation of the failover system. Examples of state information might include failover statistics, configuration information, heartbeat signals, the amount of free memory, the amount of processor resources being used, the number of connections being used to a back end device, the number of connections being used to a client, response times, trace route information, ping times, ping latencies, and/or other types of information that might be useful in determining when a failover event has occurred. Alternatively, or additionally, the state information might include information regarding a service supported by a peer node. When the failover system includes peer nodes that support different services, the state information may be useful in segregating the peer nodes based on the service(s) that the peer nodes support.

Figure 6:
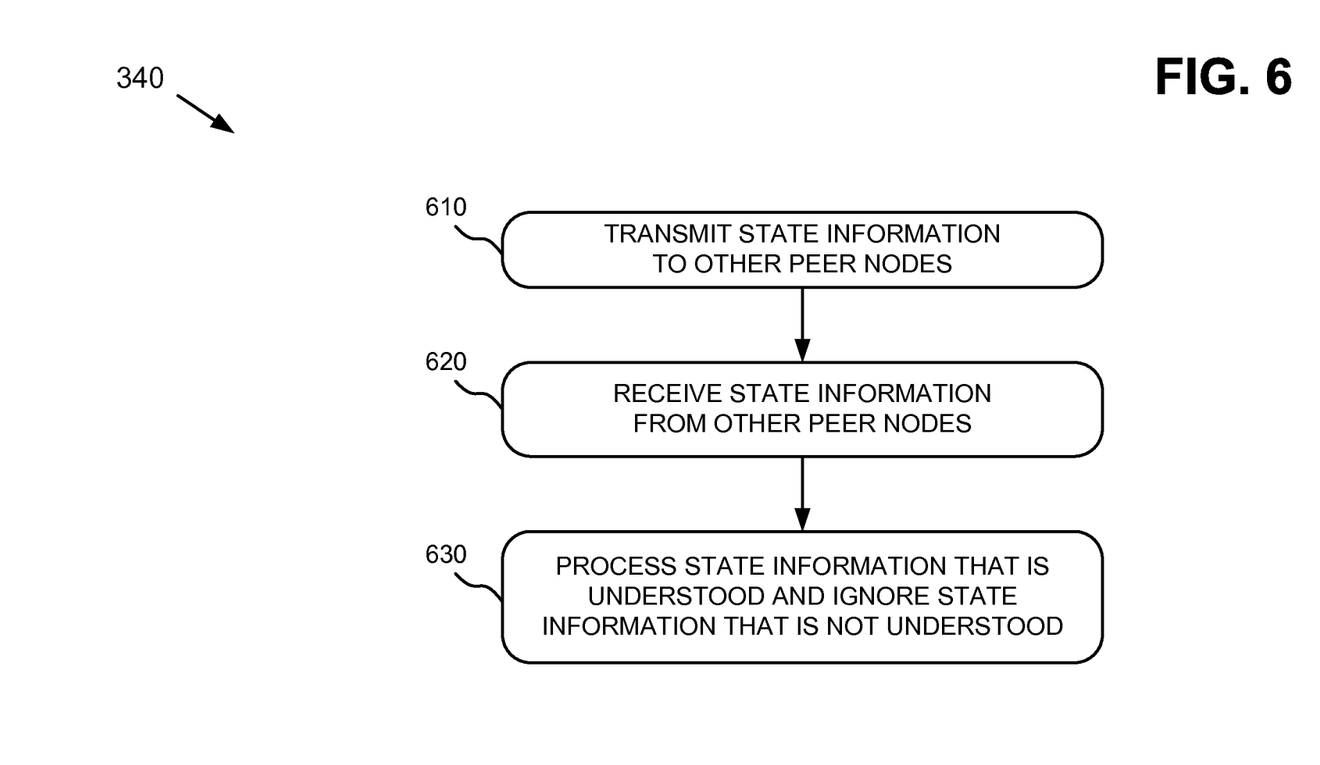

FIG. 6 is a flowchart of exemplary processing for exchanging state information between peer nodes 110. State information may be transmitted to other peer nodes (block 610). For example, peer node 110A may periodically transmit state information to all (or a subset) of the peer nodes on its list of peer nodes. The transmission of the state information may occur on a regular, or irregular, basis.

State information may be received from other peer nodes (block 620). For example, peer node 110A may receive state information from all (or a subset) of the peer nodes on its list of peer nodes. The reception of the state information may occur on a regular, or irregular, basis. If no state information is received from a peer node within a predetermined time period, then that peer node may be identified as unreachable.

State information that is understood may be processed and state information that is not understood may be ignored (block 630). The state information in the failover system may be fully extensible without making it incompatible with older implementations. For example, some peer nodes within the failover system may include software/hardware that support additional and/or different forms of state information from other peer nodes within the failover system. Updating the software/hardware associated with the peer nodes in the failover system may take time. Therefore, at any point in time, there may be different versions of software/hardware in some of the peer nodes. By configuring the peer nodes to process only that state information that they understand and ignore the state information that they do not understand, the failover system may continue to operate seamlessly even though the peer nodes contain different versions of software/hardware.

In this case, peer node 110A may receive state information from the peer nodes in its list of peer nodes. The state information from one of the peer nodes may include more, fewer, or different pieces of data than the state information received from another one of the peer nodes. Peer node 110A may ignore any state information that it does not understand. Peer node 110A may process the state information that it understands to determine the state (or health) of the corresponding peer node. This state determination may facilitate a determination of whether a failover event has occurred within the failover system. If a failover event has occurred, appropriate action may be taken.

EXAMPLE

Figure 7:
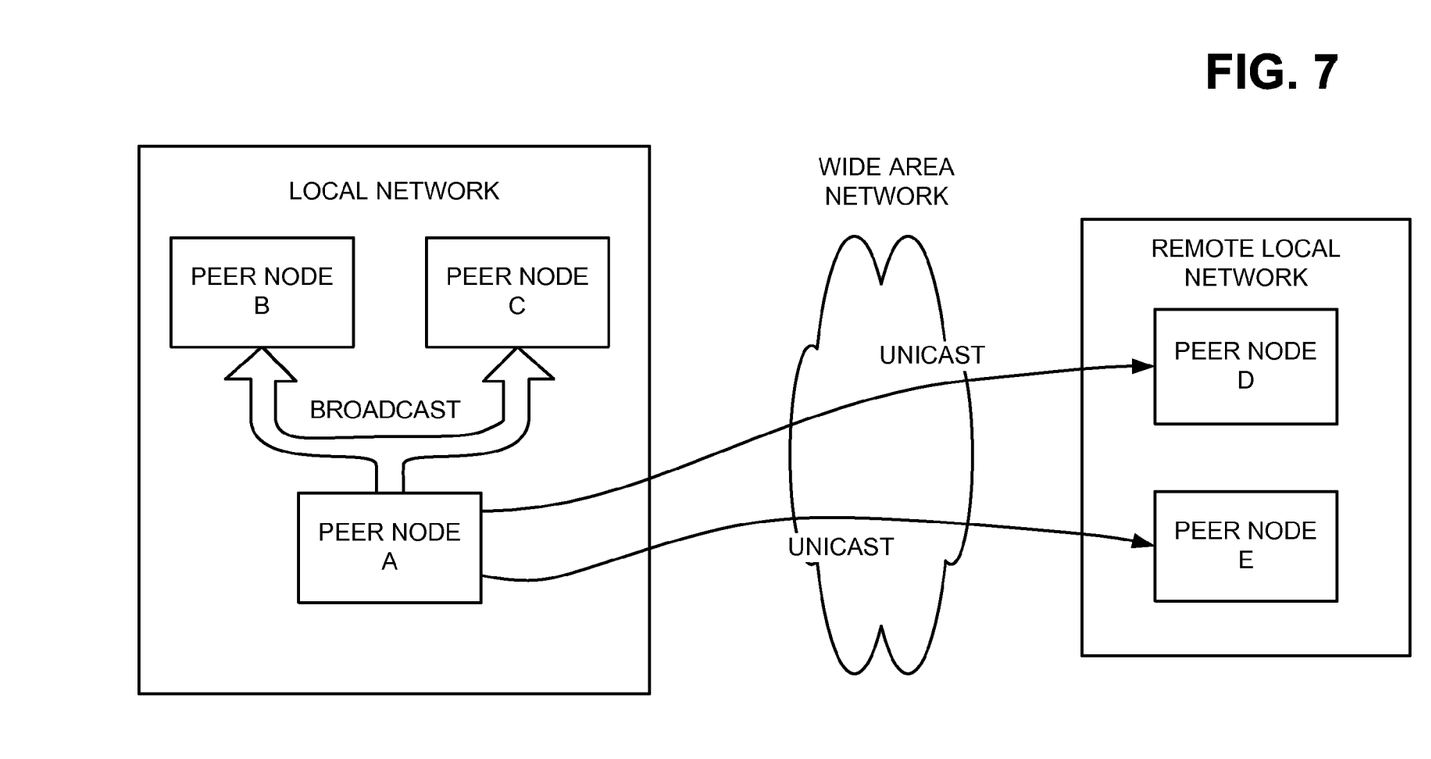
FIGS. 7-9 are diagrams illustrating an exemplary implementation consistent with the principles of the invention.
Figure 8:
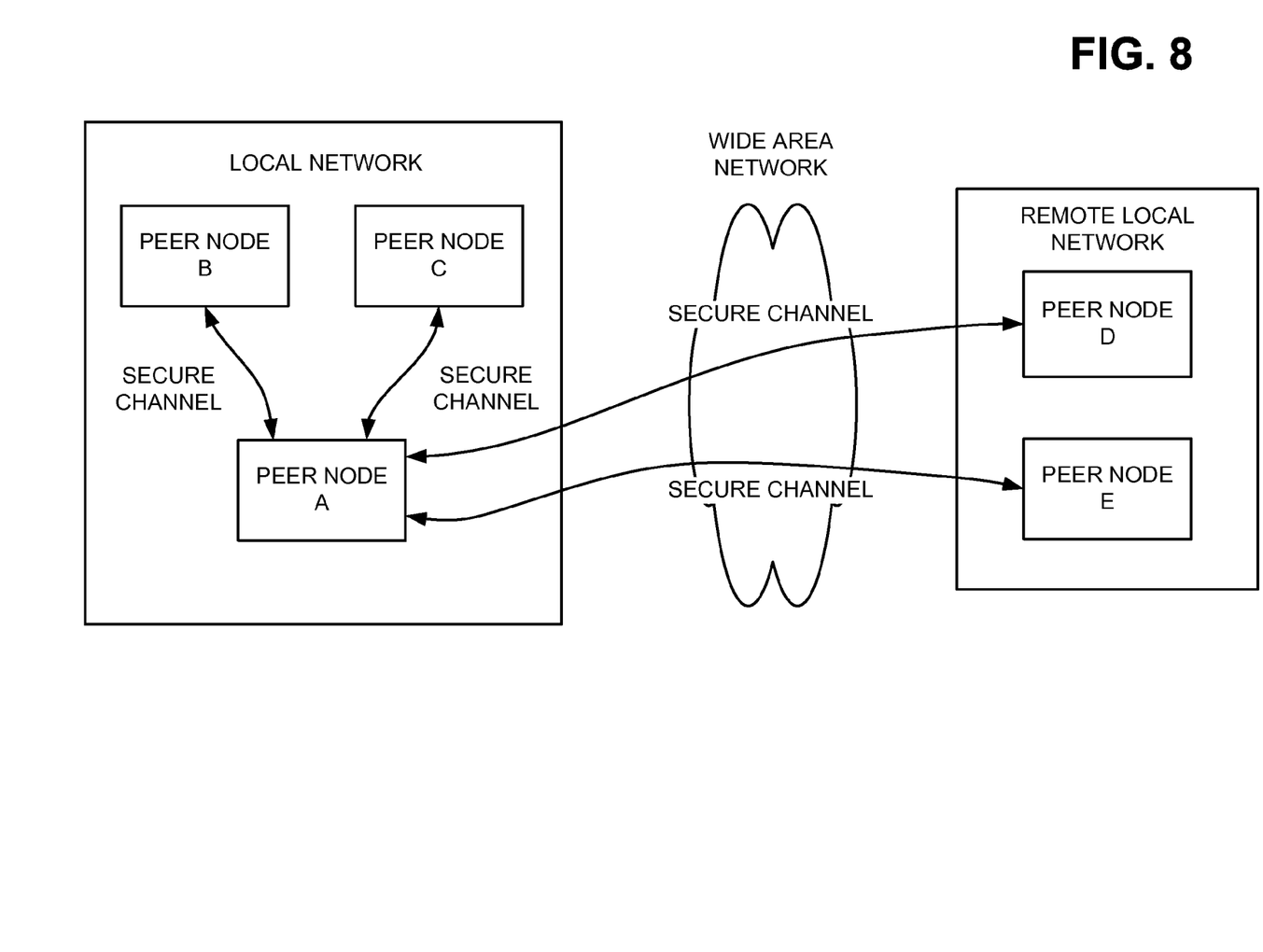
Figure 9:
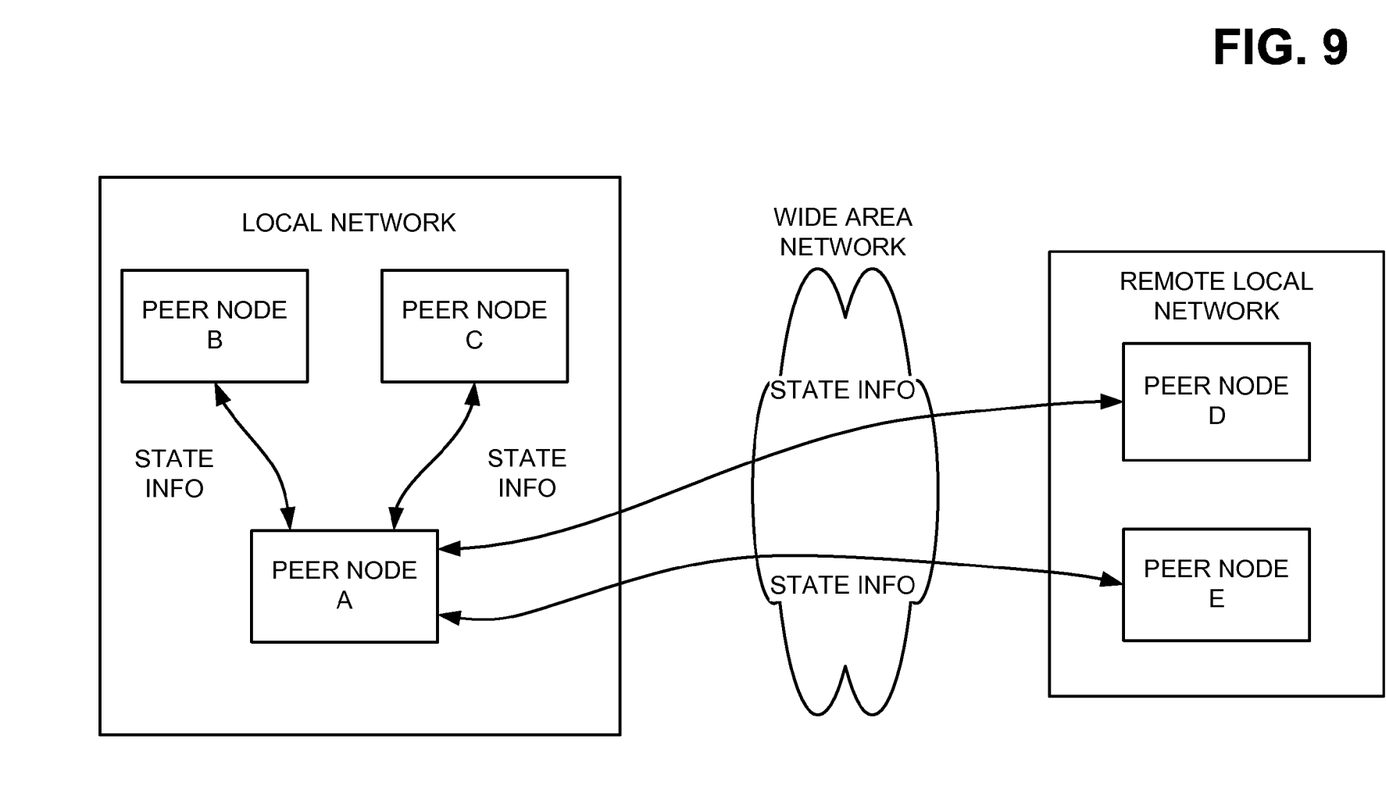

FIGS. 7-9 are diagrams illustrating an exemplary implementation consistent with the principles of the invention. The processing described with regard to FIGS. 7-9 will be described in terms of a single peer node within a failover system. It should be understood that this processing may also be performed by some or all of the peer nodes in the failover system.

As shown in FIG. 7, peer node A may broadcast a discovery message to local peer nodes within the same local network, such as peer nodes B and C, to dynamically discover the identity of local peer nodes within the local network. These local peer nodes may respond to the discovery message with a response message. As further shown in FIG. 7, peer node A may send unicast discovery messages to remote peer nodes, such as peer nodes D and E, to statically discover the identity of remotely-connected peer nodes. These remote peer nodes may respond to the discovery message with a response message. Peer node A may generate a list of peer nodes based on the response messages received from the local and remote peer nodes.

Once the local and remote peer nodes have been discovered, peer node A may negotiate establishment of a secure channel with the peer nodes in its list of peer nodes, as shown in FIG. 8. Peer node A may contact each of the local and remote peer nodes and negotiate with each of them a form of secure communication to use for the secure channel. The negotiation may include the offer and eventual acceptance of a form of secure communication that is supported by both peer nodes. The secure channel between each of the peer nodes may help prevent the poisoning of the state information, which is a basic form of a denial of service attack.

Peer node A may then exchange state information with the peer nodes in its list of peer nodes over the secure channels that have been established, as shown in FIG. 9. As explained above, the state information received from the peer nodes may differ based on the possibly different versions of software/hardware implemented within the peer nodes. Assume that the state information from peer node B includes state metric 1, state metric 2, and state metric 3, and that the state information from peer node E includes state metric 1, state metric 2, state metric 6, and state metric 10. Assume further that peer node A is currently configured to process only state metrics 1-8. In this case, peer node A may process the state metrics 1-3 from peer node B to determine the state (or health) of peer node B. Peer node A may process the state metrics 1, 2, and 6, and ignore state metric 10, to determine the state (or health) of peer node E. Peer node A may use the determined state of peer nodes B and E to determine when a failover event has occurred in the failover system. If a failover event occurs, appropriate action may be taken. For example, one or more of the peer nodes may take over operation for another peer node so that the failover system can continue to operate seamlessly.

CONCLUSION

Implementations consistent with the principles of the invention may provide a technique for providing secure communication of state information in a failover system, including the discovery of peer nodes and the negotiation of a secure form of communication between the peer nodes. The secure communication of the state information helps protect the failover system from attacks, such as an attacker poisoning the state information to make it appear that a peer node in the failover system has failed.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 3-6, the order of the acts may differ in other implementations consistent with the principles of the invention. Also, non-dependent acts may be performed in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects were described without reference to the specific software code—it being understood that one of ordinary skill in the art would be able to design software and control hardware to implement the aspects based on the description herein.

Also, it has been described that data may be broadcast to dynamically discover local peer nodes, and unicast to statically discover remote peer nodes. In an alternate implementation, data may transmitted using a different technique, such as multicasting, to discover local and/or remote peer nodes. For example, data may be broadcast, multicast, and/or unicast to discover local peer nodes. Similarly, data may be multicast and/or unicast to discover remote peer nodes.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
one or more processors to:
   transmit a discovery message;
   identify a peer node based on transmitting the discovery message;
   offer, to the peer node, one or more forms of secure communication to be used to exchange state information;
   determine whether the device and the peer node support a common form of secure communication based on offering the one or more forms of secure communication;
   selectively establish:
      the secure channel between the device and the peer node using the common form of secure communication, or
      an unsecure channel between the device and the peer node,
         the one or more processors establishing the secure channel when the device and the peer node support the common form of secure communication, and
         the one or more processors establishing the unsecure channel when the device and the peer node do not support the common form of secure communication;
   exchange the state information over the secure channel or the unsecure channel,
      when exchanging the state information, the one or more processors are to:
         transmit first state information to the peer node, and
         receive second state information from the peer node; and
   determine an occurrence of a failover event based on the second state information.

2. The device of claim 1, where, when transmitting the discovery message, the one or more processors are to:
   send the discovery message via a local area network.

3. The device of claim 1, where, when transmitting the discovery message, the one or more processors are to:
   send the discovery message via a wide area network.

4. The device of claim 1, where, when receiving the second state information, the one or more processors are to:
   receive, from the peer node, one or more of:
      failover statistics associated with the peer node,
      configuration information associated with the peer node,
      information identifying an amount of free memory of the peer node,
      information identifying an amount of processor resources being used by the peer node,
      information associated with a quantity of first connections being used by the peer node to communicate with a back end device,
      information associated with a quantity of connections being used by the peer node to communicate with a client device,
      information identifying response times associated with the peer node,
      trace route information associated with the peer node,
      information identifying ping times associated with the peer node,
      information identifying ping latencies associated with the peer node, or
      information associated with a service supported by the peer node.

5. The device of claim 1, where, when determining the occurrence of the failover event, the one or more processors are to:
   determine a state of the peer node based on the second state information, and
   determine the occurrence of the failover event based on the state of the peer node.

6. The device of claim 2, where, when sending the discovery message, the one or more processors are to:
   send, via the local area network, a broadcast discovery message to dynamically discover the peer node.

7. The device of claim 3, where, when sending the discovery message, the one or more processors are to:
   send, via the wide area network, a unicast discovery message to statically discover the peer node.

8. A method comprising:
   transmitting, by a device, a discovery message;
   identifying, by the device, a peer node based on transmitting the discovery message;
   offering, by the device and to the peer node, one or more forms of secure communication to be used to exchange state information;
   determining, by the device, whether the device and the peer node support a common form of secure communication based on offering the one or more forms of secure communication;
   selectively establishing:
      the secure channel using the common form of secure communication, or
      an unsecure channel between the device and the peer node,
         the device establishing the secure channel when the device and the peer node support the common form of secure communication, and
         the device establishing the unsecure channel when the device and the peer node do not support the common form of secure communication;
   exchanging, by the device, the state information over the secure channel or the unsecure channel,
      the exchanging including:
         transmitting first state information to the peer node, and
         receiving second state information from the peer node; and
   determining, by the device, an occurrence of a failover event based on the second state information.

9. The method of claim 8, where identifying the peer node includes:
   identifying the peer node based on performing a discovery technique via a local area network.

10. The method of claim 8, where transmitting the discovery message includes:
   transmitting, via a local area network, a broadcast discovery message, and
   where identifying the peer node includes:
      identifying the peer node based on transmitting the broadcast discovery message via the local area network.

11. The method of claim 8, identifying the peer node includes:
   identifying the peer node based on performing a discovery technique via a wide area network.

12. The method of claim 8, where transmitting the discovery message includes:
   transmitting a unicast discovery message via a wide area network; and
   where identifying the peer node includes:
      identifying the peer node based on sending the unicast discovery message via the wide area network.

13. The method of claim 8, further comprising:
   determining, based on the second state information, a state of the peer node; and
   where determining the occurrence of the failover event includes:
      determining the occurrence of the failover event based on the state of the peer node.

14. The method of claim 8, where the second state information includes one or more of:
   failover statistics associated with the peer node,
   configuration information associated with the peer node,
   information identifying an amount of free memory of the peer node,
   information identifying an amount of processor resources being used by the peer node,
   information associated with a quantity of first connections being used by the peer node to communicate with a back end device,
   information associated with a quantity of connections being used by the peer node to communicate with a client device,
   information identifying response times associated with the peer node,
   trace route information associated with the peer node,
   information identifying ping times associated with the peer node,
   information identifying ping latencies associated with the peer node, or
   information associated with a service supported by the peer node.

15. A non-transitory computer-readable medium storing instructions, the instructions comprising:
   one or more instructions that, when executed by a processor of a device, cause the processor to:
      transmit a discovery message;
      identify a peer node based on transmitting the discovery message;
      offer, to the peer node, a form of secure communication for exchanging state information between the peer node and the device;
      determine whether the device and the peer node support the form of secure communication based on offering the form of secure communication to the peer node;
      selectively establish the secure channel or an unsecure channel between the device and the peer node,
         the secure channel being established when the device and the peer node support the form of secure communication, and
         the unsecure channel being established when the device and the peer node do not support the form of secure communication;
      exchange the state information over the secure channel or the unsecure channel,
         the one or more instructions to exchange the state information including:
            one or more instructions that, when executed by the processor, cause the processor to:
               transmit first state information to the peer node, and
               receive second state information from the peer node; and
      detect an occurrence of a failover event based on the second state information.

16. The non-transitory computer-readable medium of claim 15, where the one or more instructions to transmit the discovery message include:
    one or more instructions that, when executed by the processor, cause the processor to:
        transmit the discovery message via a local area network.

17. The non-transitory computer-readable medium of claim 15, where the one or more instructions to transmit the discovery message include:
    one or more instructions that, when executed by the processor, cause the processor to:
        transmit a broadcast discovery message to discover the peer node.

18. The non-transitory computer-readable medium of claim 15, where the one or more instructions to transmit the discovery message include:
    one or more instructions that, when executed by the processor, cause the processor to:
        transmit the discovery message via a wide area network.

19. The non-transitory computer-readable medium of claim 15, where the peer node comprises a local peer node associated with a local area network or a remote peer node associated with a wide area network, and
    where the one or more instructions to transmit the discovery message include:
        one or more instructions that, when executed by the processor, cause the processor to:
            transmit a broadcast discovery message via the local area network, or
            transmit a unicast discovery message via the wide area network.

20. The non-transitory computer-readable medium of claim 15, where the one or more instructions to detect the occurrence of the failover event include:
    one or more instructions that, when executed by the processor, cause the processor to:
        determine, based on exchanging the state information, a state of the peer node; and
        detect the occurrence of the failover event based on the state of the peer node.

\* \* \* \* \*